United States Patent
Ugaji et al.

(10) Patent No.: US 7,736,811 B2
(45) Date of Patent: Jun. 15, 2010

(54) SOLID ELECTROLYTE AND ALL SOLID STATE BATTERY USING THE SAME

(75) Inventors: Masaya Ugaji, Suita (JP); Shinji Mino, Ibaraki (JP); Yasuyuki Shibano, Hirakata (JP); Shuji Ito, Nara (JP)

(73) Assignee: Panasonic Corporation, Osaka (JP)

( * ) Notice: Subject to any disclaimer, the term of this patent is extended or adjusted under 35 U.S.C. 154(b) by 1086 days.

(21) Appl. No.: 10/553,208

(22) PCT Filed: Jun. 24, 2004

(86) PCT No.: PCT/JP2004/009302

§ 371 (c)(1),
(2), (4) Date: Oct. 13, 2005

(87) PCT Pub. No.: WO2005/001983

PCT Pub. Date: Jan. 6, 2005

(65) Prior Publication Data

US 2006/0210882 A1 Sep. 21, 2006

(30) Foreign Application Priority Data

Jun. 27, 2003 (JP) ............................. 2003-184625

(51) Int. Cl.
*H01M 6/18* (2006.01)
*H01M 10/36* (2010.01)
*H01B 1/06* (2006.01)

(52) U.S. Cl. .................................................... 429/322

(58) Field of Classification Search ................. 429/302, 429/306, 322
See application file for complete search history.

(56) References Cited

U.S. PATENT DOCUMENTS

| 5,597,660 A | 1/1997 | Bates et al. |
| 6,365,300 B1 | 4/2002 | Ota et al. |
| 2003/0175585 A1 | 9/2003 | Ugaji et al. |

FOREIGN PATENT DOCUMENTS

EP  1 052 718 A1  11/2000

(Continued)

OTHER PUBLICATIONS

Lee et al., "Electrical Conductivity in Li-Si-P-O-N oxynitride films", Journal of Power Sources, vol. 123, Issue 1, Sep. 15, 2003, pp. 61-64.*

(Continued)

*Primary Examiner*—Gregg Cantelmo
(74) *Attorney, Agent, or Firm*—McDermott Will & Emery LLP

(57) ABSTRACT

A solid electrolyte of the present invention is represented by a general formula: $Li_aP_bM_cO_dN_e$, where M is at least one element selected from the group consisting of Si, B, Ge, Al, C, Ga and S, and a, b, c, d and e respectively satisfy $a=0.62$ to $4.98$, $b=0.01$ to $0.99$, $c=0.01$ to $0.99$, $d=1.070$ to $3.985$, $e=0.01$ to $0.50$, and $b+c=1.0$. The solid electrolyte hardly deteriorates in a wet atmosphere.

3 Claims, 2 Drawing Sheets

FOREIGN PATENT DOCUMENTS

| | | |
|---|---:|---|
| EP | 1 217 682 A2 | 6/2002 |
| JP | 2000-340257 A | 12/2000 |
| JP | 2002-198050 | 7/2002 |
| JP | 2002-203593 A | 7/2002 |
| KR | 10-2002-0063681 | 8/2002 |
| WO | WO 02/089236 A1 | 11/2002 |

OTHER PUBLICATIONS

Whitacre et al., "Crystalline Li3PO4/Li4SiO4 Solid Solutions As An Electrolyte For Film Batteries Using Sputtered Cathode Layers", SSI-14 Conference, Jun. 2003, pp. 1-11.*

Chinese Office Action, with English translation, issued in Chinese Patent Application No. CN 2004800147392, mailed Sep. 7, 2007.

European Office Action issued in European Patent Application No. EP 04746771.7-1227 PCT/JP2004009302, dated Apr. 11, 2008.

* cited by examiner

SOLID ELECTROLYTE AND ALL SOLID STATE BATTERY USING THE SAME

RELATED APPLICATION

This application is the U.S. National Phase under 35 U.S.C. §371 of International Application No. PCT/JP2004/009302, filed on Jun. 24, 2004, which in turn claims the benefit of Japanese Application No. 2003-184625, filed on Jun. 27, 2003, the disclosure of which Applications are incorporated by reference herein.

TECHNICAL FIELD

The present invention relates to an all solid state battery, particularly to a solid electrolyte used in an all solid state thin film lithium secondary battery.

BACKGROUND ART

With the development in portable devices such as personal computers and mobile phones, demand is growing for batteries as power sources for such devices.

In batteries for such application, an electrolyte composed of a liquid such as organic solvent has been used as a medium for transferring ions. For this reason, there is a possibility that problems such as leakage of electrolyte from the battery might occur.

In order to solve the above problems, development is under way to produce an all solid state battery using, instead of a liquid electrolyte, a solid electrolyte. An all solid state lithium secondary battery, in particular, is vigorously being studied in many fields as a battery capable of providing a high energy density. This is because Li has a low atomic weight, the greatest ionization tendency, and the lowest reduction potential, and thus, for example, the use of Li metal in a negative electrode active material yields a high electromotive force.

Well-known examples of the solid electrolyte used for the all solid state lithium secondary battery are lithium halide, lithium nitride, lithium oxyacid salts and derivatives thereof. For example, U.S. Pat. No. 5,597,660 reports in the specification that lithium phosphorus oxynitride ($Li_xPO_yN_z$, where x, y and z satisfy x=2.8 and 3z+2y=7.8) obtained by introducing nitrogen (N) into lithium orthophosphate ($Li_3PO_4$) has a very high lithium ion conductivity of $1\times10^{-6}$ to $2\times10^{-6}$ S/cm although it is an oxide-based material.

When the lithium phosphorus oxynitride is exposed to a wet atmosphere, however, phosphorus atoms (P) forming the lithium phosphorus oxynitride react with water molecules present in the wet atmosphere, during which the phosphorus atoms are reduced to a lower oxidation state from an oxidation state of +5. Thereby, lithium phosphorus oxynitride is decomposed, which significantly decreases the ion conductivity thereof.

When such decrease in ion conductivity occurs in an all solid state battery using a solid electrolyte composed of lithium phosphorus oxynitride, internal impedance will increase. For this reason, its charge/discharge rate characteristics will be significantly impaired.

In view of the above, an object of the present invention is to provide a solid electrolyte capable of preventing the ion conductivity from decreasing even in a wet atmosphere, and an all solid state battery using the solid electrolyte.

DISCLOSURE OF INVENTION

The solid electrolyte of the present invention is represented by a general formula:

$Li_aP_bM_cO_dN_e$, where M is at least one element selected from the group consisting of Si, B, Ge, Al, C, Ga and S, and where a, b, c, d and e respectively satisfy a=0.62 to 4.98, b=0.01 to 0.99, c=0.01 to 0.99, d=1.070 to 3.985, e=0.01 to 0.50, and b+c=1.0.

In the formula, it is preferred that a=0.62 to 2.98, b=0.01 to 0.99, c=0.01 to 0.99, d=1.070 to 3.965, e=0.01 to 0.50, and b+c=1.0.

In the formula, it is preferred that a=1.61 to 2.99, b=0.01 to 0.99, c=0.01 to 0.99, d=2.060 to 3.975, e=0.01 to 0.50, and b+c=1.0.

In the formula, it is preferred that a=1.61 to 2.99, b=0.01 to 0.99, c=0.01 to 0.99, d=3.050 to 3.985, e=0.01 to 0.50, and b+c=1.0.

In the formula, it is preferred that a=2.6 to 3.0, b=0.01 to 0.99, c=0.01 to 0.99, d=2.60 to 3.975, e=0.01 to 0.50, and b+c=1.0.

In the formula, it is preferred that a=2.61 to 3.99, b=0.01 to 0.99, c=0.01 to 0.99, d=3.050 to 3.985, e=0.01 to 0.50, and b+c=1.0.

In the formula, it is preferred that a=2.62 to 4.98, b=0.01 to 0.99, c=0.01 to 0.99, d=3.050 to 3.985, e=0.01 to 0.50, and b+c=1.0.

The present invention further relates to an all solid state battery comprising a positive electrode, a negative electrode and the aforesaid solid electrolyte disposed between the positive electrode and the negative electrode.

BEST MODE FOR CARRYING OUT THE INVENTION

Figure 1:
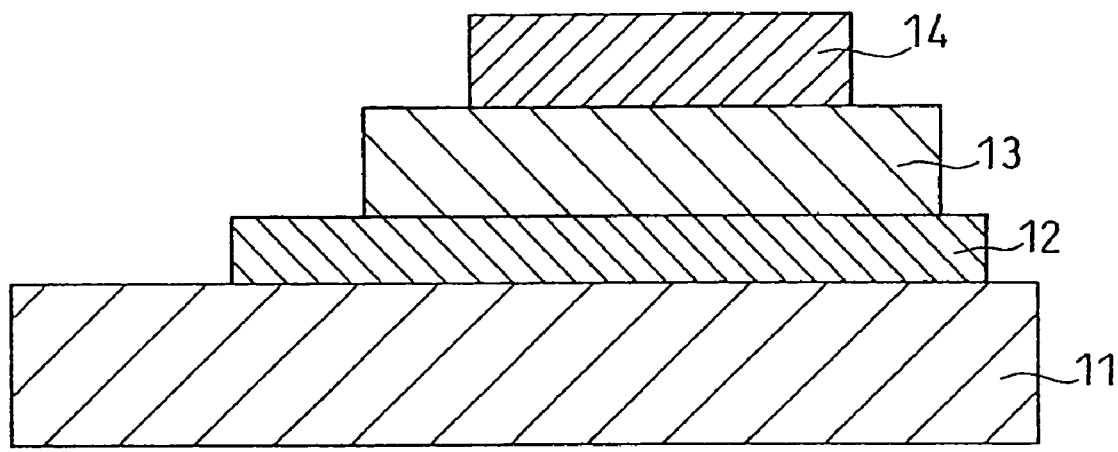
FIG. 1 is a schematic cross sectional view of a test cell used for the evaluation of solid electrolytes in Examples of the present invention.

The solid electrolyte of the present invention is composed of Li (lithium), O (oxygen), N (nitrogen), P (phosphorous) and at least one element M selected from the group consisting of Si (silicon), B (boron), Ge (germanium), Al (aluminum), C (carbon), Ga (gallium) and S (sulfur).

For example, the solid electrolyte can be composed of a nitride of a lithium oxyacid salt containing phosphorus and the element M. In this case, phosphorus and the element M may be mixed at atomic level to form a nitride of the lithium oxyacid salt. Alternatively, lithium phosphorus oxynitride, which is a nitride of a lithium oxyacid salt containing phosphorus, and a nitride of a lithium oxyacid salt containing the element M may be mixed at particle level.

The electrolyte of the present invention is represented by the general formula $Li_aP_bM_cO_dN_e$, where M is at least one element selected from the group consisting of Si, B, Ge, Al, C, Ga and S, and where a, b, c, d and e respectively satisfy a=0.62 to 4.98, b=0.01 to 0.99, c=0.01 to 0.99, d=1.070 to 3.985, e=0.01 to 0.50, and b+c=1.0.

When lithium phosphorus oxynitride, which is a conventionally used solid electrolyte, is allowed to stand in a wet atmosphere, it will readily react with water, which significantly decreases the ion conductivity. This is because some proportion of P (phosphorus) contained in the lithium phosphorus oxynitride reacts with water present in the atmosphere, and is reduced from a valence of +5.

The solid electrolyte of the present invention, on the other hand, contains the element M capable of thermodynamically forming a stabler bond with oxygen than a bonding state between phosphorus and oxygen in the lithium phosphorus oxynitride. This stabilizes the structure of the solid electrolyte and improves the reduction resistance of phosphorus, allowing the P in the solid electrolyte to retain a valence of +5. For this reason, it is possible to prevent the ion conductivity of the solid electrolyte from decreasing in a wet atmosphere.

In the above general formula, when c is 0.01 to 0.99, the decrease in ion conductivity due to storage in a wet atmosphere can be prevented. When c is less than 0.01, the reduction of phosphorus cannot be prevented sufficiently. Preferably, c is 0.10 to 0.99. When a nitride of a lithium oxyacid salt containing phosphorus and the element M is used to obtain a solid electrolyte, the nitride can form a solid solution, thus yielding a solid electrolyte which is chemically stable in a resultant battery.

Further, it is particularly preferred that c be 0.1 to 0.5. By increasing the concentration of phosphorus in the solid electrolyte of the present invention, it is possible to obtain a solid electrolyte which is not only chemically stable even if it contacted Li metal, but also has higher lithium ion conductivity.

When e is 0.01 to 0.50, high ion conductivity will be obtained, and the decrease in ion conductivity due to storage in a wet atmosphere will be prevented. When e is less than 0.01, high ion conductivity will hardly be retained. Further, if a nitride of a lithium oxyacid salt is used to obtain a solid electrolyte, when e exceeds 0.50, the framework structure of the lithium oxyacid salt will be damaged, which is likely to result in a decrease in ion conductivity. The use of such solid electrolyte having decreased ion conductivity in a thin film all solid state secondary battery increases the resistance of the solid electrolyte, which significantly impairs charge/discharge characteristics.

The composition of the electrolyte varies according to the type of the element M used, the ratio of the element M to phosphorus in the solid electrolyte of the present invention, etc. In other words, a, b and d in the above general formula depend on the composition or type of the lithium oxyacid salt containing the element M used as the raw material, and the ratio of the element M to phosphorus in the solid electrolyte of the present invention. Accordingly, a is in a range of 0.62 to 4.98. b is in a range of 0.01 to 0.99. d is in a range of 1.070 to 3.985.

The above-described solid electrolyte may further contain an element other than those listed above as long as the effect of the present invention is not impaired.

The solid electrolyte of the present invention can also be made from, for example, lithium orthophosphate ($Li_3PO_4$), which is a lithium oxyacid salt containing phosphorus, and a lithium oxyacid salt containing the element M by partially substituting nitrogen for oxygen. The lithium oxyacid salt containing the element M as the raw material may be a single compound or a mixture of two or more. Further, other than lithium orthophosphate, other lithium phosphate (e.g., $LiPO_3$) or a mixture of $Li_2O$ and $P_2O_5$ can also be used as the lithium oxyacid salt containing phosphorus. Further, other than the lithium oxyacid salt containing the element M, a mixture of $Li_2O$ and a lithium oxyacid salt containing the element M, or a mixture of $Li_2O$ and an oxide containing the element M may be used. Further, the solid electrolyte of the present invention may be made from lithium phosphorus oxynitride and a nitride of a lithium oxyacid salt containing the element M.

For example, when lithium orthophosphate and any of $LiBO_2$, $LiAlO_2$ and $LiGaO_2$ are used as the raw material, in other words, when producing a solid oxide represented by the previously described general formula, where M is B, Al or Ga, it is preferred that a=0.62 to 2.98, b=0.01 to 0.99, c=0.01 to 0.99, d=1.070 to 3.965, e=0.01 to 0.50, and b+c=1.

For example, when lithium orthophosphate and any of $Li_2SiO_3$, $Li_2GeO_3$ and $Li_2CO_3$ are used as the raw material, in other words, when producing a solid oxide represented by the previously described general formula, where M is Si, Ge or C, it is preferred that a=1.61 to 2.99, b=0.01 to 0.99, c=0.01 to 0.99, d=2.060 to 3.975, e=0.01 to 0.50, and b+c=1.

For example, when lithium orthophosphate and $Li_2SO_4$ are used as the raw material, in other words, when producing a solid oxide represented by the previously described general formula, where M is S, it is preferred that a=1.61 to 2.99, b=0.01 to 0.99, c=0.01 to 0.99, d=3.050 to 3.985, e=0.01 to 0.50, and b+c=1.

For example, when lithium orthophosphate and $Li_3BO_3$ are used as the raw material, in other words, when producing a solid oxide represented by the previously described general formula, where M is B, it is preferred that a=2.6 to 3.0, b=0.01 to 0.99, c=0.01 to 0.99, d=2.060 to 3.975, e=0.01 to 0.50, and b+c=1.

For example, when lithium orthophosphate and either $Li_4SiO_4$ or $Li_4GeO_4$ are used as the raw material, in other words, when producing a solid oxide represented by the previously described general formula, where M is Si or Ge, it is preferred that a=2.61 to 3.99, b=0.01 to 0.99, c=0.01 to 0.99, d=3.050 to 3.985, e=0.01 to 0.50, and b+c=1.

For example, when lithium orthophosphate and $Li_5AlO_4$ are used as the raw material, in other words, when producing a solid oxide represented by the previously described general formula, where M is Al, it is preferred that a=2.62 to 4.98, b=0.01 to 0.99, c=0.01 to 0.99, d=3.050 to 3.985, e=0.01 to 0.50, and b+c=1.

Lithium orthophosphate and the above-listed lithium oxyacid salts should be used to satisfy the previously described general formula.

The solid electrolyte of the present invention is preferably a thin film. The thickness thereof can be appropriately adjusted, and the preferred thickness is 0.1 to 10 µm.

The solid electrolyte of the present invention may be either crystalline or amorphous.

Further, as the solid electrolyte of the present invention, phosphorus and the element M may be mixed at atomic level to form a nitride of a lithium oxyacid salt in solid solution. Alternatively, lithium phosphorus oxynitride, which is a nitride of a lithium oxyacid salt containing phosphorus, and a nitride of a lithium oxyacid salt containing the element M may be mixed at particle level.

As for the method for producing a solid electrolyte of the present invention, similar to the method for producing a simple substance of lithium phosphorus oxynitride, which is a conventional solid electrolyte, there can be used, for example, a thin film forming technique using a vacuum apparatus. It is needless to say that a method other than this can also be used.

Examples of the method for forming a thin film composed of a solid oxide of the present invention include sputtering method in which a target is sputtered using nitrogen ($N_2$) by means of a magnetron or high frequency and a combined method of vapor deposition method and ion beam irradiation for introducing nitrogen ions. Examples of the vapor deposition include resistance heating vapor deposition method in which vapor deposition is performed by heating a vapor deposition source using a resistance; electron beam vapor deposition method in which vapor deposition is performed by heating a vapor deposition source using an electron beam; and laser ablation method in which vapor deposition is performed by heating a vapor deposition source using a laser.

In the vapor deposition, as the target or vapor deposition source, the use of lithium orthophosphate ($Li_3PO_4$) and a lithium oxyacid salt containing the element M is necessary.

For example, in the case of sputtering method, as the target, lithium orthophosphate as a lithium oxyacid salt containing phosphorus and a lithium oxyacid salt containing the element M are used. For example, in the case of resistance heating vapor deposition method, electron beam vapor deposition method and laser ablation method, as the vapor deposition source, lithium orthophosphate as a lithium oxyacid salt containing phosphorus and a lithium oxyacid salt containing the element M are used.

In either of the sputtering method and vapor deposition method, oxygen contained in the lithium orthophosphate and oxygen contained in the lithium oxyacid salt containing the element M can be partially nitrified simultaneously by introducing nitrogen.

Further, resistance heating vapor deposition method using lithium orthophosphate as the vapor deposition source and electron beam vapor deposition method using a lithium oxyacid salt containing the element M as the vapor deposition source can be combined. Other than this, the combination of resistance heating vapor deposition method and laser ablation method, and the combination of electron beam vapor deposition method and laser ablation method are also possible.

A mixture of lithium oxyacid salt obtained by mixing a lithium oxyacid salt containing the element M with lithium phosphate at a given mixing ratio may be used as the target or vapor deposition source.

As the target or vapor deposition source, other than the above-mentioned lithium orthophosphate, other lithium phosphate (e.g., $LiPO_3$) and a mixture of $Li_2O$ and $P_2O_5$, which are lithium oxyacid salts containing phosphorus, can also be used. Further, other than a lithium oxyacid salt containing the element M, a mixture of $Li_2O$ and a lithium oxyacid salt containing the element M, or a mixture of $Li_2O$ and any of $SiO_2$, $Bi_2O_3$, $GeO_2$, $Al_2O_3$ and $Ga_2O_3$ may be used.

An all solid state battery of the present invention can be obtained by using the above-described solid electrolyte.

Figure 2:
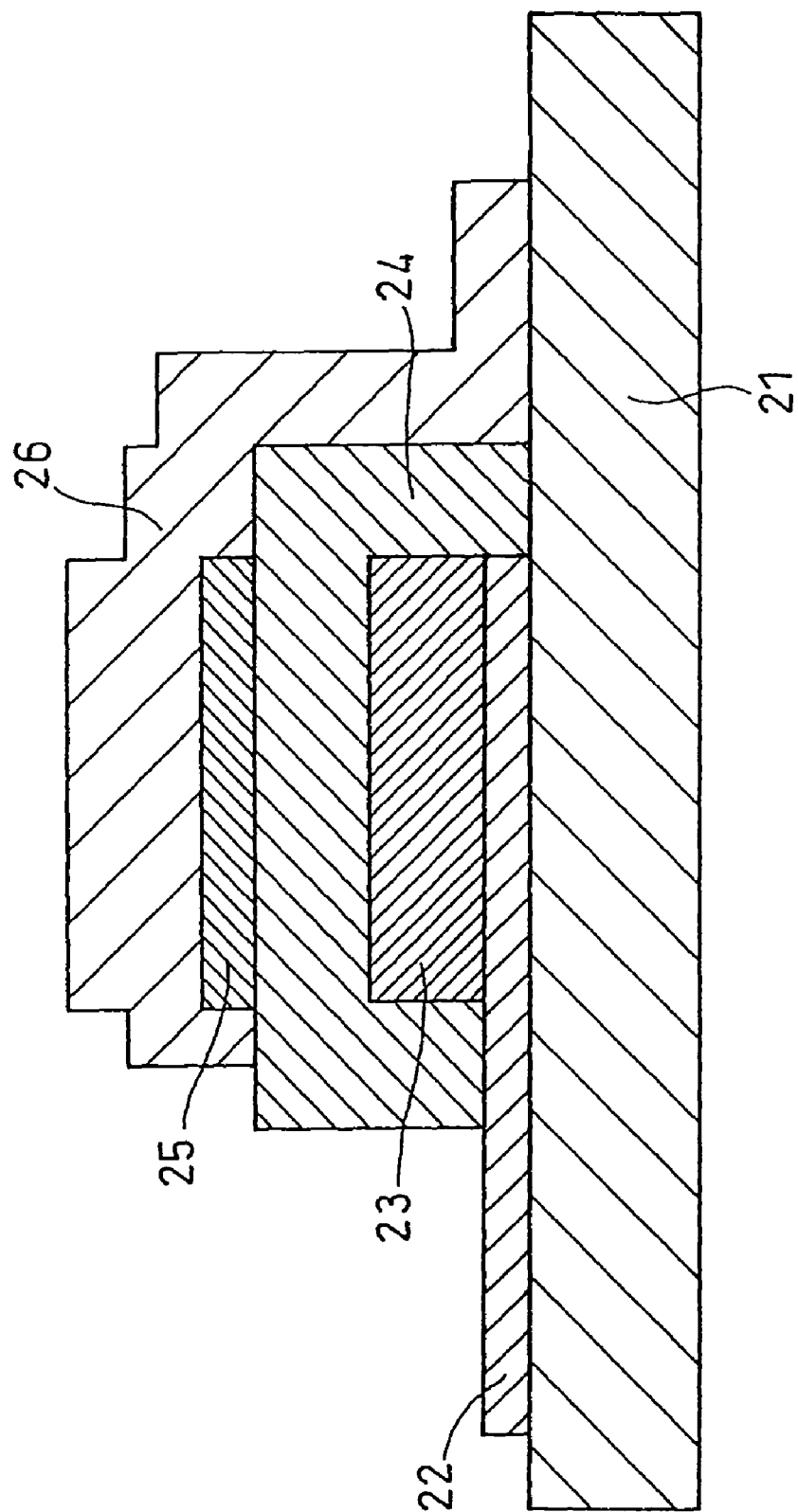
FIG. 2 is a schematic cross sectional view of an all solid state battery in Examples of the present invention.

As an example of an all solid state battery using the solid electrolyte of the present invention, FIG. 2 shows a schematic cross sectional view of an all solid state thin film lithium secondary battery.

The all solid state thin film lithium secondary battery comprises a base plate 21, and a first current collector 22, a first electrode 23, a solid electrolyte 24 of the present invention, a second electrode 25 and a second current collector 26 which are formed on the base plate 21. In this case, the first electrode serves as the positive electrode layer, and the second electrode serves as the negative electrode layer. However, the first electrode may serve as the negative electrode layer, and the second electrode may serve as the positive electrode layer.

This battery can be obtained by laminating, on the base plate 21, the first current collector 22, the first electrode 23, the solid electrolyte 24, the second electrode 25, and the second current collector 26 in this order using a thin film forming method using a vacuum apparatus. It is needless to say that a method other than the thin film forming method using a vacuum apparatus can be used. Further, a resin or aluminum laminate film may be placed on the second current collector 26 to form a protection layer.

As the base plate 21, there can be used an electrically insulating base plate such as alumina, glass or polyimide film; a semiconductor base plate such as silicon; or a electron conductive base plate such as aluminum or copper. In the case of using the electron conductive base plate, in order to prevent the first current collector 22 from electrically connecting to the second current collector 26, an electrically insulating material is placed on at least either of the interface between the first current collector 22 and the base plate 21 or the interface between the second current collector 26 and the base plate 21. Because the base plate preferably has a low surface roughness, it is effective to use a plate having mirror-finished surface or the like.

As the first current collector 22 placed on the base plate 21, for example, there can be used an electron conductive material such as platinum, platinum/palladium, gold, silver, aluminum, copper or ITO (indium-tin oxide film). Other than those listed above, any material having electron conductivity and unreactive with the first electrode 23 can be used as the current collector.

As for the method for producing the first current collector 22, there can be used sputtering method, resistance heating vapor deposition method, ion beam vapor deposition method or electron beam vapor deposition method. When the base plate 21 is composed of an electron conductive material such as aluminum, copper or stainless steel, the first current collector 22 may be omitted.

The first electrode (positive electrode layer) 23 is preferably composed of, for example, a positive electrode material for lithium secondary batteries such as lithium cobaltate ($LiCoO_2$), lithium nickelate ($LiNiO_2$) or lithium manganate ($LiMn_2O_4$), and a transition metal oxide such as vanadium oxide ($V_2O_5$), molybdenum oxide ($MoO_3$) or titanium sulfide ($TiS_2$). Besides those listed above, any material that can be used for a positive electrode for lithium secondary batteries can be used for the first electrode 23.

As for the method for producing the first electrode (positive electrode layer) 23, there can be used sputtering method, resistance heating vapor deposition method, ion beam vapor deposition method, electron beam vapor deposition method or laser ablation method.

As the solid electrolyte 24, the solid electrolyte of the present invention described previously is used.

The second electrode (negative electrode layer) 25 is preferably composed of, for example, a negative electrode material for lithium secondary batteries such as a carbon material (C) including graphite or hard carbon, any of an alloy containing tin (Sn), lithium cobalt nitride (LiCoN), lithium metal (Li) or a lithium alloy (e.g. LiAl). Other than those listed above, any material that can be used as a negative electrode for lithium secondary batteries can be used for the second electrode 25.

As for the method for forming the second electrode (negative electrode layer) 25, there can be used sputtering method, resistance heating vapor deposition method, ion beam vapor deposition method, electron beam vapor deposition method or laser ablation method.

As the second current collector 26, the materials listed in the case of the first current collector 22 can be used. Similarly, as the method for producing the second current collector 26, the methods listed in the case of the first current collector 22 can be used.

It is also possible to stack a plurality of such all solid state batteries to form a stacked battery.

Although this embodiment has been described for the case of using an all solid state thin film lithium secondary battery as an example of the all solid state battery of the present invention, it should be understood that the present invention is not limited thereto.

Hereinafter, the present invention will be described using examples, but it should be understood that the present invention is not limited thereto.

Examples 1 to 10

Test cells were produced by the following procedure so as to evaluate solid electrolytes.

In the first step, at a predetermined position on a silicon base plate 11 having a mirror-finished surface having been oxidized and a surface roughness of not greater than 30 nm was placed a metal mask having an opening with a size of 20 mm×10 mm, after which rf magnetron sputtering method was performed to form a film composed of platinum. Thereby, a platinum current collector layer 12 having a thickness of 0.5 μm was obtained.

Subsequently, in the second step, on the thus-obtained platinum current collector layer 12 was placed a metal mask having an opening with a size of 15 mm×15 mm, after which rf magnetron sputtering method was performed to form a solid electrolyte layer 13 having a thickness of 1.0 μm and the composition shown in Table 2.

In the rf magnetron sputtering method, lithium orthophosphate ($Li_3PO_4$) and a lithium oxyacid salt shown in Table 1 were used as the target. The sputtering gas used here was nitrogen ($N_2$).

TABLE 1

|  | Lithium oxyacid salt used as target |
|---|---|
| Example 1 | $Li_4SiO_4$ |
| Example 2 | $Li_2SiO_3$ |
| Example 3 | $LiBO_2$ |
| Example 4 | $Li_2GeO_3$ |
| Example 5 | $Li_4GeO_4$ |
| Example 6 | $LiAlO_2$ |
| Example 7 | $Li_5AlO_4$ |
| Example 8 | $Li_2CO_3$ |
| Example 9 | $LiGaO_2$ |
| Example 10 | $Li_2SO_4$ |

The conditions for the rf magnetron sputtering method were as follows. The chamber internal pressure was 2.7 Pa. The amount of gas introduced was 10 sccm. The high frequency power irradiated to the lithium orthophosphate target was 200 W. The sputtering time was two hours. Further, the high frequency power irradiated to the element M-containing lithium oxyacid salt target was controlled so as to obtain a solid electrolyte of lithium oxyacid salt including phosphorus and element M at a molar ratio of 1:4 and having the composition shown in Table 2.

In the third step, on the solid electrolyte layer 13 produced above was placed a metal mask having an opening with a size of 10 mm×10 mm such that the mask did not extend beyond the solid electrolyte layer 13, after which rf magnetron sputtering method was performed to form a film composed of platinum. Thereby, a platinum current collector layer 14 having a thickness of 0.5 μm was obtained.

Comparative Example 1

In the second step, with the use of lithium orthophosphate as the target, a solid electrolyte thin film composed of lithium phosphorus oxynitride ($Li_{2.8}PO_{3.45}N_{0.3}$) was formed in the same manner as in Example 1. Thereby, a solid electrolyte having a thickness of 1.0 μm was obtained. A test cell was produced in the same manner as in Example 1 except for this second step.

[Evaluation]

In order to evaluate the solid electrolyte films in terms of water resistance, the test cells of Examples 1 to 10 and Comparative Example 1 produced above were stored in a controlled chamber with a humidity of 50% and a temperature of 20° C. for two weeks. For each of the test cells, alternating current impedance was measured five times: immediately after the production, one day after the storage, two days after the storage, one week after the storage and two weeks after the storage, so as to check a change in ion conductivity with time. The conditions for the alternating current impedance measurement were as follows. The equilibrium voltage was zero, the amplitude of the applied voltage was ±10 mV, and the range of the frequency used was $10^5$ to 0.1 Hz. Ion conductivity was determined from the result of the alternating current impedance measurement.

The evaluation results are shown in Table 2. Note that the ion conductivity is expressed in relative value with the ion conductivity obtained from the result of the impedance measurement done immediately after the production of the test cells set at 100.

TABLE 2

| | | Ion conductivity | | | | |
|---|---|---|---|---|---|---|
| | Solid electrolyte layer | Immediately after production | 1 day after storage | 2 days after storage | 1 week after storage | 2 weeks after storage |
| Ex. 1 | $Li_{3.0}P_{0.8}Si_{0.2}O_{3.45}N_{0.3}$ | 100.00 | 96.36 | 94.09 | 90.91 | 90.00 |
| Ex. 2 | $Li_{2.6}P_{0.8}Si_{0.2}O_{3.25}N_{0.3}$ | 100.00 | 93.53 | 89.41 | 87.65 | 87.06 |
| Ex. 3 | $Li_{2.4}P_{0.8}B_{0.2}O_{3.05}N_{0.3}$ | 100.00 | 90.90 | 84.30 | 80.99 | 80.17 |
| Ex. 4 | $Li_{2.6}P_{0.8}Ge_{0.2}O_{3.25}N_{0.3}$ | 100.00 | 85.33 | 78.67 | 74.67 | 74.67 |
| Ex. 5 | $Li_{3.8}P_{0.8}Ge_{0.2}O_{3.45}N_{0.3}$ | 100.00 | 94.81 | 92.45 | 90.57 | 90.09 |
| Ex. 6 | $Li_{2.4}P_{0.8}Al_{0.2}O_{3.05}N_{0.3}$ | 100.00 | 90.98 | 86.89 | 83.61 | 82.79 |
| Ex. 7 | $Li_{3.2}P_{0.8}Al_{0.2}O_{3.45}N_{0.3}$ | 100.00 | 94.53 | 91.05 | 88.06 | 87.56 |
| Ex. 8 | $Li_{2.6}P_{0.8}C_{0.2}O_{3.25}N_{0.3}$ | 100.00 | 88.28 | 82.07 | 77.93 | 77.24 |
| Ex. 9 | $Li_{2.4}P_{0.8}Ga_{0.2}O_{3.05}N_{0.3}$ | 100.00 | 92.50 | 86.67 | 83.33 | 82.50 |
| Ex. 10 | $Li_{2.6}P_{0.8}S_{0.2}O_{3.45}N_{0.3}$ | 100.00 | 84.44 | 80.74 | 77.04 | 76.30 |
| Comp. Ex. 1 | $Li_{2.8}PO_{3.45}N_{0.3}$ | 100.00 | 71.43 | 50.00 | 35.71 | 14.29 |

Table 2 indicates that, for the solid electrolytes of Examples 1 to 10, the decrease of ion conductivity was prevented even after storage in the wet atmosphere. However, for the solid electrolyte of Comparative Example 1 without the element M, the ion conductivity decreased significantly after storage.

The foregoing illustrates that the deterioration of the solid electrolytes was prevented in Examples 1 to 10.

Examples 11 to 18 and Comparative Example 2

In the second step, lithium orthosilicate ($Li_4SiO_4$) was used as a lithium oxyacid salt. The high frequency power irradiated to the lithium orthosilicate target was controlled so as to obtain solid electrolytes having the compositions shown in Table 3. In other words, solid electrolytes represented by a general formula $Li_aP_bSi_cO_dN_e$, where c was varied in the range of 0.005 to 0.99 were produced. Test cells were produced in the same manner as in Example 1 except for the second step.

Subsequently, for each of the test cells, evaluation was made immediately after the production and two weeks after the storage in the same manner as in Example 1. The evaluation results are shown in Table 3. Note that the ion conductivity is expressed in relative value with the ion conductivity obtained immediately after the production of the test cell set at 100. Further, the ion conductivity immediately after the production is expressed in relative value with the ion conductivity of Comparative Example 2 set at 100.

TABLE 3

| | | Ion conductivity | | Ion conductivity relative to that of Comp. Ex. 2 |
|---|---|---|---|---|
| | Solid electrolyte layer | Immediately after production | 2 weeks after storage | |
| Comp. Ex. 2 | $Li_{2.805}P_{0.995}Si_{0.005}O_{3.45}N_{0.3}$ | 100.00 | 31.23 | 100.00 |
| Ex. 11 | $Li_{2.81}P_{0.99}Si_{0.01}O_{3.45}N_{0.3}$ | 100.00 | 73.64 | 100.00 |
| Ex. 12 | $Li_{2.85}P_{0.95}Si_{0.05}O_{3.45}N_{0.3}$ | 100.00 | 83.18 | 97.73 |
| Ex. 13 | $Li_{2.9}P_{0.9}Si_{0.1}O_{3.45}N_{0.3}$ | 100.00 | 88.18 | 95.45 |
| Ex. 14 | $Li_{3.0}P_{0.8}Si_{0.2}O_{3.45}N_{0.3}$ | 100.00 | 90.00 | 86.36 |
| Ex. 15 | $Li_{3.3}P_{0.5}Si_{0.5}O_{3.45}N_{0.3}$ | 100.00 | 90.45 | 84.09 |
| Ex. 16 | $Li_{3.4}P_{0.4}Si_{0.6}O_{3.45}N_{0.3}$ | 100.00 | 89.91 | 59.09 |
| Ex. 17 | $Li_{3.7}P_{0.1}Si_{0.9}O_{3.45}N_{0.3}$ | 100.00 | 89.09 | 34.09 |
| Ex. 18 | $Li_{3.79}P_{0.01}Si_{0.99}O_{3.45}N_{0.3}$ | 100.00 | 87.27 | 32.73 |

As is evident from Table 3, for the solid electrolytes of Examples 11 to 18 which were represented by a general formula $Li_aP_bSi_cO_dN_e$ where c was 0.01 or greater, the decrease in ion conductivity was prevented after storage in the wet atmosphere. Particularly, for those of Examples 13 to 18 when c was 0.1 to 0.99, the decrease in ion conductivity was further prevented. For the solid electrolyte of Comparative Example 2 where c was 0.005, however, the ion conductivity decreased significantly after the storage.

Table 3 also indicates that high ion conductivity was obtained in Examples 11 to 15 where c was 0.5 or less.

This illustrates that the solid electrolytes of the present invention produced by using lithium phosphate and lithium orthosilicate ($Li_4SiO_4$) as a raw material can be represented by a general formula $Li_aP_bSi_cO_dN_e$, and that, when c is 0.01 to 0.99, the decrease in ion conductivity due to storage in a wet atmosphere is prevented. It has been found that, particularly, c is preferably 0.1 to 0.99, and more preferably, 0.1 to 0.5.

Examples 19 to 24 and Comparative Example 3

In the second step, lithium germanate ($Li_4GeO_4$) was used as a lithium oxyacid salt. The high frequency power irradiated to the lithium germanate target was controlled so as to obtain solid electrolytes having the compositions shown in Table 4. In other words, solid electrolytes represented by a general formula $Li_aP_bGe_cO_dN_e$, where c was varied in the range of 0.005 to 0.99 were produced. Test cells were produced in the same manner as in Example 1 except for the second step.

Subsequently, for each of the test cells, evaluation was made immediately after the production and two weeks after the storage in the same manner as in Example 1. The evaluation results are shown in Table 4. Note that the ion conductivity is expressed in relative value with the ion conductivity obtained immediately after the production of the test cell set at 100. Further, the ion conductivity immediately after the production is expressed in relative value with the ion conductivity of Comparative Example 3 set at 100.

TABLE 4

| | | Ion conductivity | | Ion conductivity relative to that of Comp. Ex. 3 |
|---|---|---|---|---|
| | Solid electrolyte layer | Immediately after production | 2 weeks after storage | |
| Comp. Ex. 3 | $Li_{2.805}P_{0.995}Ge_{0.005}O_{3.45}N_{0.3}$ | 100.00 | 32.41 | 100.00 |
| Ex. 19 | $Li_{2.81}P_{0.99}Ge_{0.01}O_{3.45}N_{0.3}$ | 100.00 | 76.42 | 100.00 |
| Ex. 20 | $Li_{2.9}P_{0.9}Ge_{0.1}O_{3.45}N_{0.3}$ | 100.00 | 87.26 | 97.67 |
| Ex. 21 | $Li_{3.0}P_{0.8}Ge_{0.2}O_{3.45}N_{0.3}$ | 100.00 | 90.09 | 86.05 |
| Ex. 22 | $Li_{3.3}P_{0.5}Ge_{0.5}O_{3.45}N_{0.3}$ | 100.00 | 89.15 | 83.72 |
| Ex. 23 | $Li_{3.4}P_{0.4}Ge_{0.6}O_{3.45}N_{0.3}$ | 100.00 | 88.68 | 60.47 |
| Ex. 24 | $Li_{3.79}P_{0.01}Ge_{0.99}O_{3.45}N_{0.3}$ | 100.00 | 84.91 | 38.14 |

As is evident from Table 4, for the solid electrolytes of Examples 19 to 24 which were represented by a general formula $Li_aP_bGe_cO_dN_e$ where c was 0.01 or greater, the decrease in ion conductivity was prevented after storage at the wet atmosphere. Particularly, for those of Examples 20 to 24 where c was 0.1 to 0.99, the decrease in ion conductivity was further prevented. For the solid electrolyte of Comparative Example 3 where c was 0.005, however, the ion conductivity decreased significantly after the storage.

Table 4 also indicates that high ion conductivity was obtained in Examples 19 to 22 where c was 0.5 or less.

This illustrates that the solid electrolytes of the present invention produced by using lithium phosphate and lithium germanate ($Li_4GeO_4$) as a raw material can be represented by a general formula $Li_aP_bGe_cO_dN_e$, and that, when c is 0.01 to 0.99, the decrease in ion conductivity due to storage in a wet atmosphere is prevented. It has been found that, particularly, c is preferably 0.1 to 0.99, and more preferably, 0.1 to 0.5.

Examples 25 to 28 and Comparative Examples 4 to 5

In the second step, a combined method of resistance heating vapor deposition method and ion beam irradiation for introducing nitrogen ions was used, and the amount of nitrogen introduced was varied so as to obtain solid electrolytes having the compositions shown in Table 5. In other words, solid electrolytes represented by a general formula $Li_aP_bSi_cO_dN_e$, where e was varied in the range of 0.005 to 1.0 were produced. The conditions for the resistance heating vapor deposition method were as follows. Lithium orthophosphate and lithium orthosilicate ($Li_4SiO_4$) were used as the vapor deposition source. The ion energy of nitrogen ion beam was 100 eV. The current density of nitrogen ions was controlled so as to obtain solid electrolytes having the compositions shown in Table 5. The vapor deposition time was 20 minutes. Test cells were produced in the same manner as in Example 1 except for the second step.

Subsequently, for each of the test cells, evaluation was made immediately after the production and two weeks after the storage in the same manner as in Example 1. The evaluation results are shown in Table 5. Note that the ion conductivity is expressed in relative value with the ion conductivity obtained immediately after the production of the test cell set at 100. Further, the ion conductivity immediately after the production is expressed in relative value with the ion conductivity of Example 27 set at 100.

TABLE 5

|  | Solid electrolyte layer | Ion conductivity | | Ion conductivity relative to that of Ex. 27 |
|---|---|---|---|---|
|  |  | Immediately after production | 2 weeks after storage |  |
| Comp. Ex. 4 | $Li_{3.0}P_{0.8}Si_{0.2}O_{3.8925}N_{0.005}$ | 100.00 | 83.81 | 55.26 |
| Ex. 25 | $Li_{3.0}P_{0.8}Si_{0.2}O_{3.885}N_{0.01}$ | 100.00 | 87.88 | 75.00 |
| Ex. 26 | $Li_{3.0}P_{0.8}Si_{0.2}O_{3.75}N_{0.1}$ | 100.00 | 89.41 | 89.47 |
| Ex. 27 | $Li_{3.0}P_{0.8}Si_{0.2}O_{3.45}N_{0.3}$ | 100.00 | 90.00 | 100.00 |
| Ex. 28 | $Li_{3.0}P_{0.8}Si_{0.2}O_{3.15}N_{0.5}$ | 100.00 | 88.65 | 97.37 |
| Comp. Ex. 5 | $Li_{3.0}P_{0.8}Si_{0.2}O_{2.4}N_{1.0}$ | 100.00 | 85.00 | 52.63 |

As is evident from Table 5, for the solid electrolytes represented by a general formula $Li_aP_bSi_cO_dN_e$, where e was 0.005 to 1.0, the decrease in ion conductivity was prevented after storage at the wet atmosphere irrespective of the value of e.

Further, it has been found that higher ion conductivity was obtained in the solid electrolytes of Examples 25 to 28 where e was 0.01 to 0.50 than those of Comparative Example 4 and 5 where e was 0.005 and 1.0, respectively.

This illustrates that the solid electrolytes of the present invention produced by using lithium phosphate and lithium orthosilicate as a raw material can be represented by a general formula $Li_aP_bSi_cO_dN_e$, and that, when e is 0.01 to 0.50, high ion conductivity is obtained and the decrease in ion conductivity due to storage in a wet atmosphere is prevented.

Examples 29 to 31

In the second step, as a lithium oxyacid salt, a lithium oxyacid salt containing Si and Ge, a mixture of lithium germanate and lithium borate, or a lithium oxyacid salt containing B and Al was used. The high frequency power irradiated to the above-listed lithium oxyacid salt target was controlled so as to obtain solid electrolytes having the compositions shown in Table 6. Namely, a solid electrolyte composed of a nitride of lithium orthophosphate and a lithium oxyacid salt containing Si and Ge ($Li_4Si_{0.5}Ge_{0.5}O_4$) (Example 29), a solid electrolyte composed of a nitride of lithium orthophosphate and lithium germanate ($Li_4GeO_4$) and lithium borate ($LiBO_2$) (Example 30), and a solid electrolyte composed of a nitride of lithium orthophosphate and a lithium oxyacid salt containing B and Al ($LiB_{0.5}Al_{0.5}O_2$) (Example 31) were produced. Test cells were produced in the same manner as in Example 1 except for the second step.

Subsequently, for each of the test cells, evaluation was made immediately after the production and two weeks after the storage in the same manner as in Example 1. The evaluation results are shown in Table 6. Note that the ion conductivity is expressed in relative value with the ion conductivity obtained immediately after the production of the test cell set at 100.

TABLE 6

|  | Solid electrolyte layer | Ion conductivity | |
|---|---|---|---|
|  |  | Immediately after production | 2 weeks after storage |
| Ex. 29 | $Li_{3.0}P_{0.8}Si_{0.1}Ge_{0.1}O_{3.45}N_{0.3}$ | 100.00 | 90.05 |
| Ex. 30 | $Li_{2.7}P_{0.8}Ge_{0.1}B_{0.1}O_{3.25}N_{0.3}$ | 100.00 | 84.91 |
| Ex. 31 | $Li_{3.0}P_{0.8}B_{0.1}Al_{0.1}O_{3.45}N_{0.3}$ | 100.00 | 81.60 |

As is evident from Table 6, in the solid electrolytes represented by a general formula $Li_aP_bM_cO_dN_e$, even when two different elements were contained as the element M, the decrease in ion conductivity was prevented without any significant change in ion conductivity after storage in the wet atmosphere.

Examples 32 to 41

In order to evaluate an all solid state batteries using the solid electrolyte of the present invention, all solid state batteries having the structure as shown in FIG. 2 were produced in the following procedure.

In the first step, at a predetermined position on a silicon base plate 11 having a mirror-finished surface having been oxidized and a surface roughness of not greater than 30 nm was placed a metal mask having an opening with a size of 20 mm×12 mm, after which rf magnetron sputtering method was performed to form a film composed of platinum. Thereby, a first current collector 22 having a thickness of 0.5 μm was obtained.

Subsequently, in the second step, on the thus-obtained first current collector 22 was placed a metal mask having an opening with a size of 10 mm×10 mm, after which rf magnetron sputtering method was performed to form a thin film composed of lithium cobaltate ($LiCoO_2$). Thereby, a first electrode (positive electrode layer) 23 having a thickness of 1.0 μm was obtained.

Subsequently, in the third step, on the above-obtained first electrode 23 was placed a metal mask having an opening with a size of 15 mm×15 mm, after which rf magnetron sputtering method was performed to form a solid electrolyte 24 having a thickness of 1.0 μm and the composition shown in Table 8.

In the rf magnetron sputtering method, lithium orthophosphate ($Li_3PO_4$) and the lithium oxyacid salt shown in Table 7 were used as the target. The sputtering gas used here was nitrogen ($N_2$).

TABLE 7

|  | Lithium oxyacid salt used as target |
|---|---|
| Example 32 | $Li_4SiO_4$ |
| Example 33 | $Li_2SiO_3$ |
| Example 34 | $LiBO_2$ |
| Example 35 | $Li_2GeO_3$ |
| Example 36 | $Li_4GeO_4$ |
| Example 37 | $LiAlO_2$ |
| Example 38 | $Li_5AlO_4$ |
| Example 39 | $Li_2CO_3$ |
| Example 40 | $LiGaO_2$ |
| Example 41 | $Li_2SO_4$ |

The conditions for the rf magnetron sputtering method were as follows. The chamber internal pressure was 2.7 Pa. The amount of gas introduced was 10 sccm. The high frequency power irradiated to the lithium orthophosphate target was 200 W. The sputtering time was two hours. Further, the high frequency power irradiated to the element M-containing lithium oxyacid salt target was controlled so as to obtain solid electrolytes of lithium oxyacid salt including phosphorus and element M at a molar ratio of 1:4 and having the compositions shown in Table 8.

In the forth step, on the above-obtained solid electrolyte 24 was placed a metal mask having an opening with a size of 10 mm×10 mm, after which resistance heating vapor deposition method was performed to form a thin film composed of lithium metal. Thereby, a second electrode (negative electrode layer) 25 having a thickness of 0.5 μm was obtained.

Further, in the fifth step, on the above-obtained second electrode 25 was placed a metal mask having an opening with a size of 20 mm×12 mm, after which rf magnetron sputtering method was performed to form a thin film composed of copper such that the thin film completely covered the negative electrode layer 25 while the thin film was not in contact with the first current collector 22. Thereby, a second current collector 26 having a thickness of 1.0 μm was obtained.

Comparative Example 6

In the third step, with the use of lithium orthophosphate as the target, a thin film composed of lithium phosphorus oxynitride ($Li_{2.8}PO_{3.45}N_{0.3}$) was formed in the same manner as in Example 32. Thereby, a solid electrolyte having a thickness of 1.0 μm was obtained. A battery was produced in the same manner as in Example 32 except for this third step.

[Evaluation]

The all solid state batteries of Examples 32 to 41 and Comparative Example 6 produced above were stored in a controlled chamber with a relative humidity of 50% and a temperature of 20° C. for two weeks. For each of the batteries, alternating current impedance was measured immediately after the production and two weeks after the storage. The conditions for the alternating current impedance measurement were as follows. The equilibrium voltage was zero, the amplitude of the applied voltage was ±10 mV, and the range of the frequency used was $10^5$ to 0.1 Hz. Internal impedance was determined from the result of the measurement.

The results of the internal impedance measurement are shown in Table 8. Note that the internal impedance is expressed in relative value with the internal impedance obtained immediately after the production of the batteries set at 100.

TABLE 8

| | | Internal impedance | |
|---|---|---|---|
| | Solid electrolyte layer | Immediately after production | 2 weeks after storage |
| Ex. 32 | $Li_{3.0}P_{0.8}Si_{0.2}O_{3.45}N_{0.3}$ | 100.00 | 111.11 |
| Ex. 33 | $Li_{2.6}P_{0.8}Si_{0.2}O_{3.25}N_{0.3}$ | 100.00 | 114.86 |
| Ex. 34 | $Li_{2.4}P_{0.8}B_{0.2}O_{3.05}N_{0.3}$ | 100.00 | 124.74 |
| Ex. 35 | $Li_{2.6}P_{0.8}Ge_{0.2}O_{3.25}N_{0.3}$ | 100.00 | 133.93 |
| Ex. 36 | $Li_{3.8}P_{0.8}Ge_{0.2}O_{3.45}N_{0.3}$ | 100.00 | 110.99 |
| Ex. 37 | $Li_{2.4}P_{0.8}Al_{0.2}O_{3.05}N_{0.3}$ | 100.00 | 118.81 |
| Ex. 38 | $Li_{3.2}P_{0.8}Al_{0.2}O_{3.45}N_{0.3}$ | 100.00 | 114.20 |
| Ex. 39 | $Li_{2.6}P_{0.8}C_{0.2}O_{3.25}N_{0.3}$ | 100.00 | 129.46 |
| Ex. 40 | $Li_{2.4}P_{0.8}Ga_{0.2}O_{3.05}N_{0.3}$ | 100.00 | 121.21 |
| Ex. 41 | $Li_{2.6}P_{0.8}S_{0.2}O_{3.45}N_{0.3}$ | 100.00 | 131.07 |
| Comp. Ex. 6 | $Li_{2.8}PO_{3.45}N_{0.3}$ | 100.00 | 700.00 |

As shown in Table 8, for the batteries of Examples 32 to 41, any significant change in internal impedance was not observed even when they were stored in the wet atmosphere. For the battery of Comparative Example 6 without the element M, however, the solid electrolyte deteriorated after the storage, as a result, the internal impedance increased significantly.

This indicates that, in Examples 32 to 41, the deterioration of the solid electrolytes was prevented.

INDUSTRIAL APPLICABILITY

As described above, the present invention can provide a solid electrolyte hardly deteriorates in a wet atmosphere.

The invention claimed is:

1. A solid electrolyte represented by a general formula:

$Li_aP_bM_cO_dN_e$, where M is Si and a, b, c, d and e respectively satisfy a=3.0 to 3.7, b=0.1 to 0.8, c=0.2 to 0.9, d=3.15 to 3.75, e=0.1 to 0.5, and b+c=1.0.

2. An all solid state battery comprising:
a positive electrode;
a negative electrode; and
the solid electrolyte in accordance with claim 1 disposed between said positive electrode and said negative electrode.

3. The solid electrolyte in accordance with claim 1, wherein said formula satisfies b=0.5 to 0.8 and c=0.2 to 0.5.

* * * * *